United States Patent Office 3,598,793
Patented Aug. 10, 1971

3,598,793
ALKALI METAL SALTS OF CARBOXYLATED DIENE POLYMERS AND VULCANIZATES THEREOF
Russell W. Koch, Blacksburg, Va., assignor to The Firestone Tire & Rubber Company, Akron, Ohio
No Drawing. Filed Dec. 10, 1968, Ser. No. 782,754
Int. Cl. C08f 27/06
U.S. Cl. 260—79.5B                                                                   8 Claims

ABSTRACT OF THE DISCLOSURE

Rubbery homopolymers of conjugated dienes of 4 and 5 carbon atoms and copolymers thereof with styrene and other vinyl aromatic monomers, which have been metalated along the backbone of the molecular chain by an alkali metal, are converted to carboxylates. Monovalent metal salts (e.g. sodium or lithium salts) of the carboxylates are compounded for curing in a zinc oxide-containing formulation. The compounded stocks have high green strength and other valuable properties.

---

This invention relates to monovalent-metal salts of rubbery carboxylated homopolymers of conjugated dienes, and particularly butadiene and isoprene, and copolymers thereof, and copolymers of butadiene and isoprene with styrene and other vinyl aromatic monomers, which salts are compounded for curing with zinc oxide. The stocks have high green strength and other valuable properties. The invention includes the compounded green stocks, the method of curing them, and the vulcanizates.

The polymers to which this invention is applicable are derived at least in part from a diene monomer, for instance rubbery polybutadienes, polyisoprenes, copolymers of butadiene and polyisoprene, butadiene-styrene copolymers, isobutylene-isoprene copolymers (commonly called butyl rubber), unsaturated ethylene-propylene terpolymers (commonly called EPT or EPDM), nitrile derivatives of butadiene and isoprene, etc.

The polymers of this invention are distinguishable from the terminally metalated polymers because they are metalated along the backbone of the molecular chain. They are polymetalated. These metalated polymers have been carboxylated and the carboxylated polymers have been vulcanized. However, when the carboxylated polymers are compounded with zinc oxide, etc. for vulcanization, a granular, crumbly polymer composition is obtained. According to this invention the free carboxylated polymers are neutralized to produce salts of monovalent metals, such as the sodium and lithium salts, and these are compounded with zinc oxide, etc. Carboxylate salts of multivalent metals are crumbly. The compounded stocks prepared from the carboxylates of monovalent metal salts can be readily sheeted out and it is found that they have high green strength. When vulcanized, they yield a very satisfactory rubber. They can be used in tires, belts, etc. in any manner that compounded natural and synthetic rubbers have been used.

The metalation along the chain is effected in any suitable manner, metalation with compounds of lithium being preferred. Compounds of other monovalent alkali metals may be used. This reaction can be carried out by means of a complex formed by the combination of any of the lithium or other alkali metal compounds used for initiation of polymerization, and a chelating amine which is preferably a tertiary diamine, but bridgehead monoamines are effective; or the reaction product of such an alkali metal compound and such an amine may be used. The amine and alkali metal compound may be added separately to the reaction vessel or they may be pre-mixed prior to addition to the reaction vessel. Instead of using an amine for the metalation, it may be effected with a combination of such an alkali metal compound, preferably a lithium compound, and potassium hydroxide or potassium t-butoxide.

The preferred alkali metal compounds for the metalation reaction are lithium compounds, and particularly saturated hydrocarbon lithiums, in which the hydrocarbon chain may be of any length but ordinarily contains no more than 20 atoms. The hydrocarbon may be an alkyl radical or an aromatic radical such as phenyl, naphthyl, tolyl, methylnaphthyl, etc., or it may be a saturated cyclic hydrocarbon radical of from 5 to 7 carbon atoms, a monounsaturated cyclic hydrocarbon radical of from 5 to 7 carbon atoms, an unconjugated unsaturated aliphatic hydrocarbon radical of from 3 to 20 carbon atoms, or an alkyllithium having one or more aromatic groups on the alkyl groups, which alkyl groups contain 1 to 20 carbon atoms. Representative compounds include, for example, methyllithium, 1-propyllithium, n-butyllithium, t-butyllithium, sec-butyllithium, n-dodecyllithium, phenyllithium, alpha- and beta-naphthyllithiums, biphenyllithium, styryllithium, benzyllithium, indanyllithium, 1-lithio-3-butene, 1-lithio-cyclohexene-3, 1-lithio-cyclohexene-2, 1,4-dilithiobutane, 1,4-dilithiobenzene, 1,3,5-trilithiopentane, 1,3,5-trilithiobenzene. Lithium adducts of polynuclear aromatic hydrocarbons as described in U.S. Pat. 3,170,903 may also be employed, for example, lithium adducts of biphenyl, naphthalene, anthracene and stilbene.

Lithium compounds alone metalate aromatic and olefinic functional groups of polymers with great difficulty even under high temperatures which degrade the polymer. However, in the presence of tertiary diamines and bridgehead monoamines, or potassium hydroxide or potassium t-butoxide, metalation proceeds rapidly and smoothly. Generally the lithium metalates the positions allylic to the double bonds in the unsaturated polymer so that the lithium atoms are positioned along the polymer chain, attached to internal carbon atoms away from terminal carbon atoms. Thus the butadiene or isoprene used in the process of this invention is lithiated along the backbone and is to be distinguished from terminally lithiated polyisoprene or polybutadiene. The extent of the lithiation depends upon the amount of metalating agent used.

The tertiary amines useful in the invention have three saturated aliphatic hydrocarbon groups attached to each nitrogen and include, for example:

Chelating tertiary diamines, and preferably those of the formula $R_2N \cdot C_xH_{2x} \cdot NR_2$ where R may be a straight- or branched-chain alkyl group of any chain length containing up to 20 carbon atoms or more, all of which are included herein, and the Rs may be the same or different, and $x$ may be any whole number from 2 to 10; and particularly the ethylene diamines in which all alkyl substituents are the same. These include, for example:

tetramethylethylenediamine
tetraethylethylenediamine
tetradecylethylenediamine
tetraoctylhexylenediamine
tetra-(mixed alkyl) ethylene diamines.

Cyclic diamines are included such as, for example:

the tetraalkyl 1,2-diamino cyclohexanes
the tetraalkyl 1,4-diamino cyclohexanes
piperazine
N,N'-dimethylpiperazine.

The bridgehead diamines include, for example:

sparteine
triethylenediamine.

Tertiary monoamines such as triethylamine are generally not very effective in this reaction. Bridgehead monoamines such as 1-aza(2-2-2) bicyclooctane and its substituted homologues such as the 4-methyl and 4-ethyl substituted derivatives thereof are quite effective.

The lithium compound and the tertiary amine are known to react with each other. Langer, "Reactions of Chelated Organolithium Compounds," Transactions of the New York Academy of Sciences, vol. 27, page 741 (1965). The following structural formulae are illustrative of the reaction products:

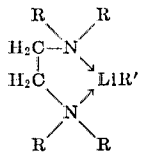

in which each R is an alkyl substituent as defined and R' is defined as the aforesaid alkyl or aromatic hydrocarbon radical of the alkali metal compound for the metalation reaction, and

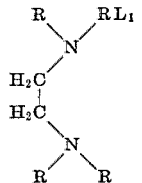

in which R is an alkyl radical as in the foregoing formula, but one hydrogen of one R has been replaced by lithium.

The lithiated polymers are soluble in hydrocarbon solvents and are readily carboxylated. These polymers comprise more than one lithium atom, the amount of lithium depending upon the amount of lithiating agent used; the weight of the lithium usually ranging from 0.001 to 1.0 percent based on the weight of the unlithiated polymer. The lithiation may be carried out at temperatures from −70° C. to 150° C. but preferably temperatures in the range of 0° C. to 100° C. are used. The time required for the lithiation depends upon the extent of lithiation required.

EXAMPLE 1

A solution of 19.3% of butadiene in heptane was prepared. A solution of 0.095 millimoles of n-butyllithium (BuLi) per milliliter of heptane was also prepared.

The butadiene solution was divided and samples were put into three different bottles, and n-butyllithium (1 part per 100 parts of butadiene) was added to each bottle as set forth in the following table:

| Sample No. | Butadiene, g. | BuLi, ml. of .095 molar solution |
| --- | --- | --- |
| 1 | 78.2 | 8.23 |
| 2 | 78.2 | 8.23 |
| 3 | 78.4 | 8.25 |

The contents of the bottle were polymerized for 19.5 hours at 50° C. and then metalated by adding a solution of 1.26 millimoles of n-butyllithium per milliliter of heptane and a solution of 1 millimole of tetramethylenediamine (TMEDA) per milliliter of heptane, in the amounts given in the following table in which "phr" stands for "parts per 100 parts of rubber," i.e. rubber polymer, and "mM" stands for "millimoles."

| Sample No. | BuLi Phr. | BuLi mM. | TMEDA Phr. | TMEDA mM. |
| --- | --- | --- | --- | --- |
| 1 (Control) | 0 | 0 | 0 | 0 |
| 2 | 20 | 15.5 | 25 | 19.5 |
| 3 | 24 | 19.8 | 30 | 23.5 |

The metalations were carried on at 50° C. for 6 hours. The lithiated polymers were then carboxylated by contact with carbon dioxide. The reaction in Eample No. 1 was terminated with methanol to convert the lithium salt to the free carboxylate, and the carboxylate was coagulated to obtain the free carboxylate polymer. The other two samples were dried at 60° C. in a vacuum oven to obtain the lithium carboxylates.

The various samples were then compounded according to the following recipe in which the figures refer to parts by weight. The green stocks and vulcanizates were tested with the results recorded below. The stress-strain properties of the green stocks (i.e. the stocks before curing) were obtained in the following manner on slabs measuring 6" x 6" x .100".

These slabs were pressed for 5 minutes at 212° F. between sheets of Holland cloth. Two strips measuring ½" x 3" x .100" were cut from this and used in the test. The recorded results are the average of tests on two strips. The test was carried out on an Instron Tester with an initial jaw separation equal to 1", a cross-head speed of 50" per minute, and a chart speed of 20" per minute, with a full-scale chart range equal to 10 pounds. The pounds at initial pull are recorded as well as the pounds at the peak and break. The percent elongation is the measured elongation of the stock at break.

| | Sample 1, carboxylate | Sample 2, Li salt | Sample 3, Li salt |
| --- | --- | --- | --- |
| Polymer | 100 | 100 | 100 |
| Filler | 62 | 62 | 62 |
| Plasticizer | 24 | 24 | 24 |
| Sulfur | 1.8 | 1.8 | 1.8 |
| Accelerator | 2.1 | 2.1 | 2.1 |
| Zinc oxide | 3 | 3 | 3 |
| Stearic acid | 2 | 2 | 2 |
| Green Stocks: | | | |
| Instron wind-up tack, lbs./in. | 0.5 | 1.1 | 0.5 |
| Stress-strain: | | | |
| Initial, lbs | 3.3 | 5.4 | 5.1 |
| Peak, lbs | 3.3 | 8.5 | 10.1 |
| Break, lbs | 3.0 | 8.4 | 10.1 |
| Elong. percent[1] | 100 | 675 | 562 |
| Vulcanizates cured 15 min. at 300° F.: | | | |
| 300% modulus, p.s.i | 1,775 | 1,900 | 1,750 |
| Tensile strength, p.s.i | 1,925 | 2,125 | 1,850 |
| Ultimate elongation | 310 | 330 | 310 |

[1] Elongation at break.

The results show that the salts had good vulcanizate properties with high green strength. Also, the polymer resulting from the lower degree of metalation had superior tack.

EXAMPLE 2

Solutions of isoprene in a hydrocarbon solvent (60 grams per bottle) were each treated with 0.162 millimoles of n-butyllithium. The isoprene was polymerized by heating for 3 hours at 50° C. The soltuions of polymer were then treated with different amounts of n-butyllithium (n-BuLi), 1.59 mM./ml. and tetramethylenediamine (TMEDA), 1 mM./ml., as set forth in the following table:

| Sample No. | n-BuLi mM. | n-BuLi Total, cc. | TMEDA mM. | TMEDA Total, cc. |
| --- | --- | --- | --- | --- |
| 1 | 9.6 | 6.08 | 12.0 | 12.0 |
| 2 | 9.6 | 6.08 | 12.0 | 12.0 |
| 3 | 10.8 | 6.84 | 13.5 | 13.5 |
| 4 | 10.8 | 6.84 | 13.5 | 13.5 |

The bottles were placed in a water bath at 50° C.; Samples No. 1 and No. 3 for 3 hours, Samples No. 2 and No. 4 for 8 hours. The contents of the bottles were reacted with $CO_2$.

The initial and final inherent viscosities and gel contents of the several samples were determined, together with the molar equivalent of carboxyl group per gram of polymer. These are recorded in the following table.

| Sample | D.S.V. Init. | D.S.V. Fin. | Gel, percent Init. | Gel, percent Fin. | COOH, m.eq./g. polymer |
| --- | --- | --- | --- | --- | --- |
| 1 | 2.00 | 2.16 | 2.9 | 0 | 0.78 |
| 2 | 1.96 | 1.73 | 3.0 | 0 | .083 |
| 3 | 2.18 | 1.25 | 0 | 0 | .077 |
| 4 | 1.57 | 1.69 | 0 | 0 | .091 |

The above samples, which were free carboxylated polymers, were converted to their sodium salts by reaction of the free carboxylate polymer wtih sodium hydroxide in toluene The four samples were mixed and coagulated, dried and compounded as follows with a control which was a sample of non-carboxylated polyisoprene with a D.S.V. of 4.42 and percent gel of 5.2.

The control and the blend of the four above samples were compounded as follows:

Compounding formula

| | Parts by weight |
|---|---|
| Polymer | 100 |
| Filler | 50 |
| Plasticizer | 12 |
| Antioxidant | 1 |
| Sulfur | 2 |
| Accelerator | 3.2 |

The stress-strain properties of the green stocks were determined in the manner described above. The different stocks were cured at 300° F. for 10, 20 and 30 minutes and the normal physical properties are recorded below together with other properties. The Stanley-London wet friction ratings as described in the Preprints of the 1964 Detroit meeting of the Rubber Division of the American Chemical Society were determined for comparison of the skid resistance of the two stocks.

| | Control | Blend |
|---|---|---|
| Green stress-strain: | | |
| Initial (lbs.) | 2.9 | 3.2 |
| Peak (lbs.) | 3.1 | 3.43 |
| Break (lbs.) | 0.1 | N.B.[1] |
| Percent elongation | 288 | 1,825 |
| Normal stress-strain physical properties: | | |
| 300% at— | | |
| 10 min | 825 | 825 |
| 20 min | 650 | 600 |
| 30 min | 550 | 475 |
| Tensile at— | | |
| 10 min | 2,975 | 2,925 |
| 20 min | 3,025 | 2,625 |
| 30 min | 2,950 | 2,375 |
| Percent elongation at— | | |
| 10 min | 710 | 750 |
| 20 min | 780 | 750 |
| 30 min | 850 | 840 |
| Stanley-London (30 min. at 300° F.): | | |
| Rating | 111 | 105 |
| Average | 53.0 | 50.3 |
| Young's modulus index at 10,000 p.s.i. (° C.) | −53.0 | −51.0 |
| Shore "A" hardness (30 min. at 300° F.) at— | | |
| 73° F | 54 | 52 |
| 212° F | 50 | 43 |

[1] No break. The percent elongation is the measured elongation at maximum stretch.

Thus the invention relates to any monovalent salt of a carboxylated rubber polymer compounded with zinc oxide and sulfur, etc. when shaped in a mold or other suitable equipment for vulcanization to produce a tire, belt or other rubber product.

I claim:

1. The improved green stock of a rubber polymer derived at least in part from a diene monomer and carboxylated along the polymer chain whereby improved green strength is imparted to the stock, which stock is compounded with zinc oxide and sulfur and is shaped for vulcanization, the improvement in which the carboxylate contains 0.001 to 1.0 percent of monovalent alkali metal based on the weight of the polymer.

2. The green stock of claim 1 in which the polymer is a conjugated diene.

3. The green stock of claim 1 in which the polymer is polybutadiene.

4. The green stock of claim 1 in which the polymer is polyisoprene.

5. The improved method of vulcanizing green stock of a rubbery polymer derived at least in part from a diene monomer and carboxylated along the polymer chain which method comprises compounding with zinc oxide and sulfur and then heating to vulcanize, the improvement which comprises the step of compounding a monovalent alkali metal salt of the carboxylate of the polymer, the carboxylate containing 0.001 to 1.0 percent of the monovalent alkali metal based on the weight of the polymer.

6. The method of claim 5 in which the polymer is a polymerized conjugated diene.

7. The method of claim 5 in which the polymer is polybutadiene.

8. The method of claim 5 in which the polymer is polyisoprene.

References Cited

UNITED STATES PATENTS

| | | | |
|---|---|---|---|
| 2,849,426 | 8/1958 | Miller | 260—79.5 |
| 3,403,136 | 9/1968 | Baker, Jr. | 260—79.5 |

FOREIGN PATENTS

| | | | |
|---|---|---|---|
| 1,478,225 | 3/1967 | France | 260—94.7 |

JOSEPH L. SCHOFER, Primary Examiner

C. A. HENDERSON, Jr., Assistant Examiner

U.S. Cl. X.R.

260—80.78, 83.3, 85.1, 85.3R, 94.7A, 775

PO-1050
(5/69)

UNITED STATES PATENT OFFICE
CERTIFICATE OF CORRECTION

Patent No. 3,598,793      Dated August 10, 1971

Inventor(s) Russell W. Koch

It is certified that error appears in the above-identified patent and that said Letters Patent are hereby corrected as shown below:

Col. 3, Line 23, in the formula, "RL1" should read --RLi--

Col. 4, Line 1, "Eample" should read --Sample--

Line 50, "soltuions" should read --solutions--

Signed and sealed this 28th day of March 1972.

(SEAL)
Attest:

EDWARD M. FLETCHER, JR.
Attesting Officer

ROBERT GOTTSCHALK
Commissioner of Patents